US010205317B2

(12) United States Patent
Sharma et al.

(10) Patent No.: US 10,205,317 B2
(45) Date of Patent: Feb. 12, 2019

(54) MANAGEMENT OF GRID-SCALE ENERGY STORAGE SYSTEMS FOR MULTIPLE SERVICES

(71) Applicant: NEC Laboratories America, Inc., Princeton, NJ (US)

(72) Inventors: Ratnesh Sharma, Fremont, CA (US); Di Shi, San Jose, CA (US); Babak Asghari, San Jose, CA (US); Rakesh Patil, San Francisco, CA (US)

(73) Assignee: NEC Corporation (JP)

( * ) Notice: Subject to any disclaimer, the term of this patent is extended or adjusted under 35 U.S.C. 154(b) by 629 days.

(21) Appl. No.: 14/821,115

(22) Filed: Aug. 7, 2015

(65) Prior Publication Data

US 2016/0043550 A1      Feb. 11, 2016

Related U.S. Application Data

(60) Provisional application No. 62/034,844, filed on Aug. 8, 2014.

(51) Int. Cl.
*H02J 3/00* (2006.01)
*H02J 3/38* (2006.01)
(Continued)

(52) U.S. Cl.
CPC .............. *H02J 3/00* (2013.01); *G05B 13/041* (2013.01); *G06Q 30/0206* (2013.01);
(Continued)

(58) Field of Classification Search
CPC . H02J 3/00; H02J 7/35; G05B 13/041; G06Q 30/0206; H02K 3/383
See application file for complete search history.

(56) References Cited

U.S. PATENT DOCUMENTS

| 2013/0184884 A1* | 7/2013 | More .................... F03D 7/0284 |
| | | 700/291 |
| 2013/0245847 A1* | 9/2013 | Steven .................... G06Q 50/06 |
| | | 700/291 |

(Continued)

FOREIGN PATENT DOCUMENTS

EP      2688173      1/2014

OTHER PUBLICATIONS

Chan, et al., "Load/Price Forecasting and Managing Demand Response for Smart Grids: Methodologies and challenges," IEEE Signal Processing Magazine, Sep. 2012, vol. 29, No. 5, pp. 68-85.

(Continued)

*Primary Examiner* — Sujay Koneru
(74) *Attorney, Agent, or Firm* — Joseph Kolodka

(57) ABSTRACT

Systems and methods for energy distribution for one or more grid-scale Energy Storage Systems (ESSs), including generating one or more time series models to provide forecasted pricing data for one or more markets, determining battery life and degradation costs for one or more batteries in or more ESSs to provide battery life and degradation costs, optimizing bids for the one or more markets to generate optimal bids based on at least one of the forecasted pricing data or the battery life and degradation costs, and distributing energy to or from the one or more ESSs based on the optimal bids generated.

16 Claims, 8 Drawing Sheets

(51) Int. Cl.
    *H02J 7/35*     (2006.01)
    *G05B 13/04*     (2006.01)
    *G06Q 30/02*     (2012.01)

(52) U.S. Cl.
    CPC ............... *H02J 3/383* (2013.01); *H02J 7/35* (2013.01); *H02J 2003/003* (2013.01); *H02J 2003/007* (2013.01); *Y02E 10/563* (2013.01); *Y02E 10/566* (2013.01); *Y02E 60/76* (2013.01); *Y04S 10/54* (2013.01); *Y04S 40/22* (2013.01); *Y04S 50/14* (2013.01)

(56) References Cited

U.S. PATENT DOCUMENTS

| | | | |
|---|---|---|---|
| 2013/0249215 A1* | 9/2013 | Egedal | H02J 3/16 290/44 |
| 2014/0172503 A1* | 6/2014 | Hammerstrom | G06Q 30/0206 705/7.31 |
| 2014/0265574 A1* | 9/2014 | Tyler | H02J 3/32 307/31 |
| 2014/0330532 A1* | 11/2014 | Simmons | G06Q 30/08 702/60 |
| 2015/0127425 A1* | 5/2015 | Greene | G06Q 30/0202 705/7.31 |

OTHER PUBLICATIONS

Nogales, et al., "Forecasting Next-day Electricity Prices by Time Series Models," IEEE Transactions Power System May 2002, vol. 17, No. 2, pp. 342-348.

Pindoriya, et al., "An Adaptive Wavelet Neural Network-Based Energy Price Forecasting in Electricity Markets", IEEE Transactions on Power Systems, Aug. 2008, vol. 23, No. 3, pp. 1423-1432.

Thatte, et al., "Towards a Unified Operational Value Index of Energy Storage in Smart Grid Environment," IEEE Transactions on Smart Grid, Sep. 2012, vol. 3, No. 3, pp. 1418-1426.

Weron, et al., "Forecasting Spot Electricity Prices With Time Series Models," Presentation at the Hugo Steinhaus Center, Wroclaw, Poland, 16 Pages, May 2005.

Michael Ward, "Working to Perfect the Flow of Energy", PJM eMKT User Guide, Jun. 2015, pp. 1-175.

R. Treinen, Market Operations, California ISP MRTU, "Locational Marginal Pricing (LMP): Basics of Nodal Price Calculation", CRR Educational Class #2, CAISO Market Operations, Dec. 2005, pp. 1-95.

Trishna Das, "Performance and Economic Evaluation of Storage Technologies", Iowa State University, Graduate Theses and Dissertations, Jan. 2013, pp. 1-258.

* cited by examiner

MANAGEMENT OF GRID-SCALE ENERGY STORAGE SYSTEMS FOR MULTIPLE SERVICES

RELATED APPLICATION INFORMATION

This application claims priority to provisional application number 62/034,844 filed Aug. 8, 2014, the contents of which are incorporated herein by reference.

BACKGROUND OF THE INVENTION

Technical Field

The present invention relates generally to management of grid-scale Energy Storage Systems (ESSs), and more particularly, to a hybrid energy management system for dynamically controlling grid-scale ESSs for multiple services.

Description of the Related Art

Grid-connected energy storage systems (ESSs) are a fast growing global market. Recently, increases in the penetration of renewable energy resources into grid-connected ESSs have presented a challenge to the traditional design and operation of electric power systems. The existing power grid was designed for centralized power generation with unidirectional power flow. With renewable energy (or any other type of distributed generation of electricity), power is effectively generated everywhere and flows in multiple directions. However, the intermittent and highly variable nature of distributed generation causes power quality and/or reliability issues, which leads to increased energy costs.

Research on forecasting electricity prices has focused on techniques including employment of neural networks, principle component analysis, averaged Monte Carlo simulations, and time series modeling. Although these methods have been applied to obtain price forecasts, the focus of these methods is simply to improve forecasting quality through improved model fitting, and processing costs and the practical application of the forecasting information are not considered. Furthermore, these conventional forecasting methods also require large amounts of data (e.g., several months, years, etc.) for forecasting of electricity prices. Moreover, this forecasting is not employed for participation in energy markets.

SUMMARY

A computer implemented method for energy distribution for one or more grid-scale Energy Storage Systems (ESSs), including generating one or more time series models to provide forecasted pricing data for one or more markets, determining battery life and degradation costs for one or more batteries in or more ESSs to provide battery life and degradation costs, optimizing bids for the one or more markets to generate optimal bids based on at least one of the forecasted pricing data or the battery life and degradation costs, and distributing energy to or from one or more ESSs based on the optimal bids generated.

A system for energy distribution for one or more grid-scale Energy Storage Systems (ESSs), including a forecaster, coupled to a bus, for generating one or more time series models to predict pricing data for one or more markets, with the one or more time series models being stored therein, a determiner for providing battery life and degradation costs for one or more batteries in the one or more ESSs, an optimizer, coupled to the bus, for generating optimal bids for the one or more markets based on the pricing data or the battery life and degradation costs for the one or more ESSs, and a controller for distributing energy to or from the one or more ESSs based on the optimal bids.

A computer-readable storage medium including a computer-readable program for energy distribution for one or more grid-scale Energy Storage Systems (ESSs), wherein the computer-readable program when executed on a computer causes the computer to perform the steps of generating one or more time series models to provide forecasted pricing data for one or more markets, determining battery life and degradation costs for one or more batteries in or more ESSs to provide battery life and degradation costs, optimizing bids for the one or more markets to generate optimal bids based on at least one of the forecasted pricing data or the battery life and degradation costs, and distributing energy to or from the one or more ESSs based on the optimal bids generated.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
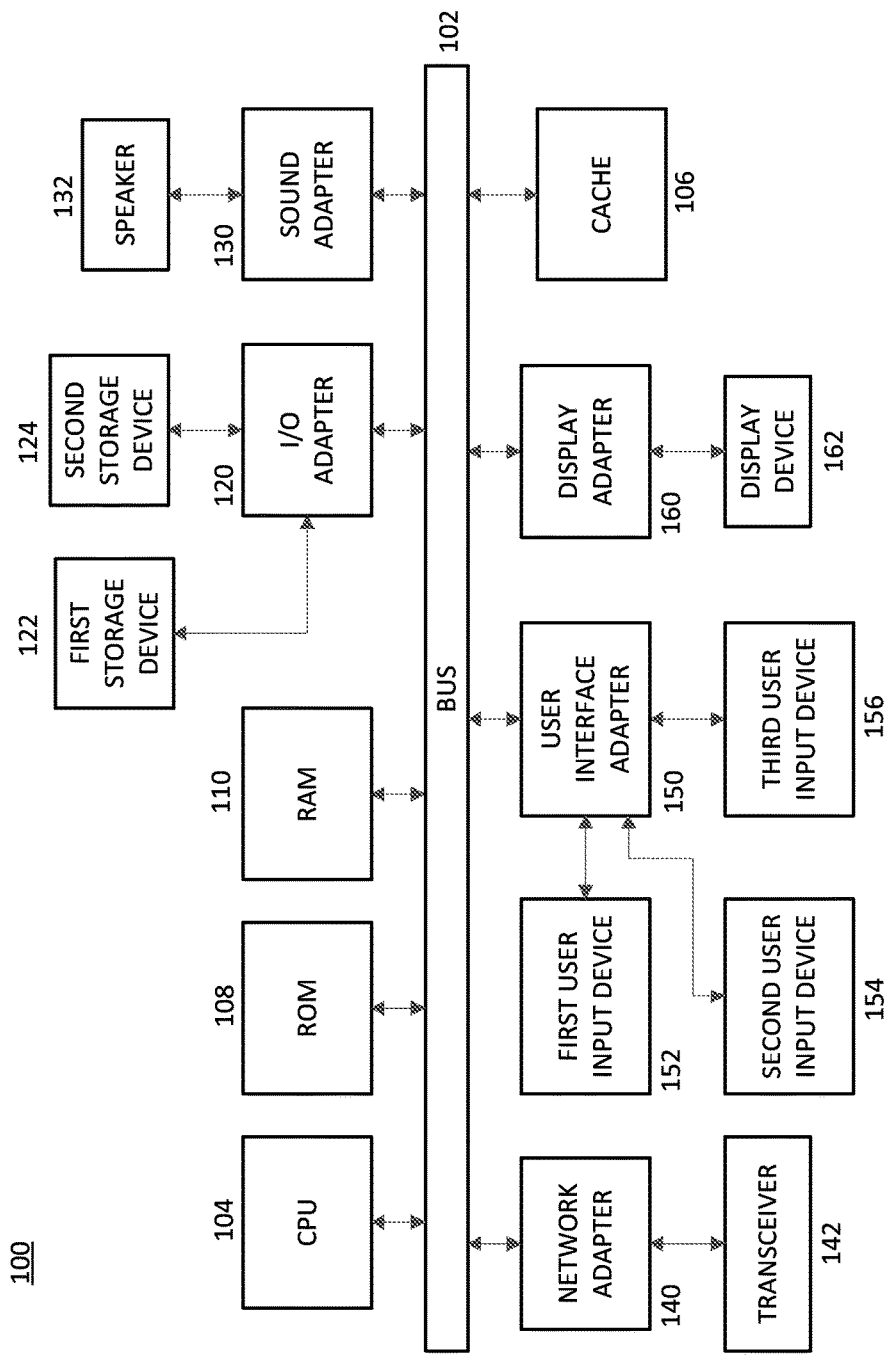
FIG. 1 shows an exemplary processing system to which the present principles may be applied, in accordance with an embodiment of the present principles.

The present principles are directed to systems and methods for hybrid energy management for dynamically controlling grid-scale Energy Storage Systems (ESSs) to improve reliability and reduce energy costs according to various embodiments.

In an embodiment, a time series based market price forecasting engine may be employed according to the present principles. Forecasted prices may be employed in conjunction with a battery degradation cost to schedule Grid Scale Storage (GSS) for participation in multiple energy markets. In addition, a novel voltage regulation method for use in GSS may advantageously be employed according to some embodiments. In a particularly useful embodiment, a portion of GSS capacity is excluded from market co-optimization. This enables GSS to generate substantial revenue from energy and Frequency Regulation (FR) markets, and also provides additional services to the energy grid as a voltage regulation provider in some embodiments.

In an embodiment, co-optimization (e.g., real-time co-optimization) is employed to meet energy demands (e.g., energy market) and to meet reserve requirements (e.g., reserve markets) by jointly clearing the energy markets and reserve markets to minimize overall costs. Co-optimization according to the present principles may be employed to meet energy demands at a minimum cost while maintaining system reliability. In an embodiment, co-optimization may be employed to schedule the GSS charge and discharge operations to maximize GSS revenue from participating in energy market and reserve markets (e.g., including frequency regulation (FR) market). Co-optimization may maximize GSS revenue from participating in different markets according to the present principles.

In an embodiment, degradation costs associated with GSS operations are considered and included when performing co-optimization because this degradation costs may result in a considerable impact on the optimal schedule of GSS in the markets. Dynamic constraints for market scheduling and operation may be employed to achieve co-optimization according to some embodiments of the present principles. To participate in day-ahead electricity markets and yield optimal revenues, a forecast or estimate of day-ahead prices may be employed.

Prices in different electricity markets (e.g., energy, FR, etc.) are known only after energy bids clear, and as such, the price forecasting engine according the present principles may be employed to participate in markets optimally. In an embodiment, the price forecasting may be performed using a small amount of data (e.g., days) with low computational effort, and may include a time series based forecasting method because this method is computationally fast and may allow for the inclusion of exogenous inputs (e.g., forecasted load and its derivatives, derivatives of past price etc.).

In an embodiment, a preventive control framework for voltage regulation through real-time adaptive control of GSSs charging and/or discharging may be implemented according to the present principles. A real-time equivalent circuit of one or more power systems may be established using voltage and/or current measured at a point of common coupling (PCC). This equivalent circuit may be employed to identify possible voltage violations in advance of any violations, and one or more GSS actions may be determined and performed to avoid any violations according to various embodiments of the present principles.

It should be understood that embodiments described herein may be entirely hardware or may include both hardware and software elements, which includes but is not limited to firmware, resident software, microcode, etc. In a preferred embodiment, the present invention is implemented in hardware. The present invention may be a system, a method, and/or a computer program product. The computer program product may include a computer readable storage medium (or media) having computer readable program instructions thereon for causing a processor to carry out aspects of the present invention.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 400, 500, 700, and 800, described below with respect to FIGS. 4, 5, 7, and 8, respectively, is a system for implementing respective embodiments of the present principles. Part or all of processing system 100 may be implemented in one or more of the elements of systems 400, 500, 700, and 800.

Figure 2:
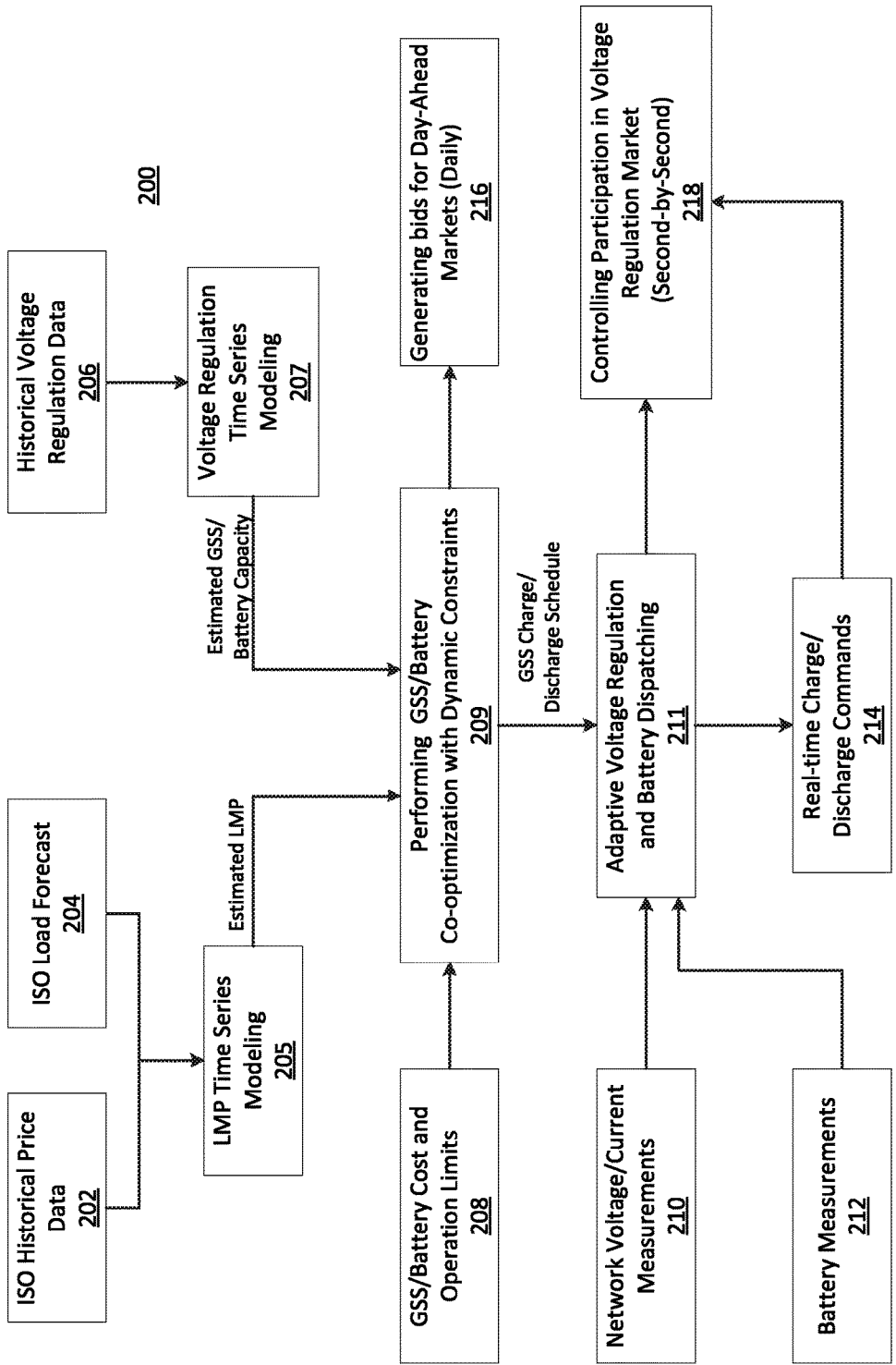
FIG. 2 shows an exemplary method for dynamically controlling grid-scale Energy Storage Systems (ESSs), in accordance with an embodiment of the present principles.
Figure 3:
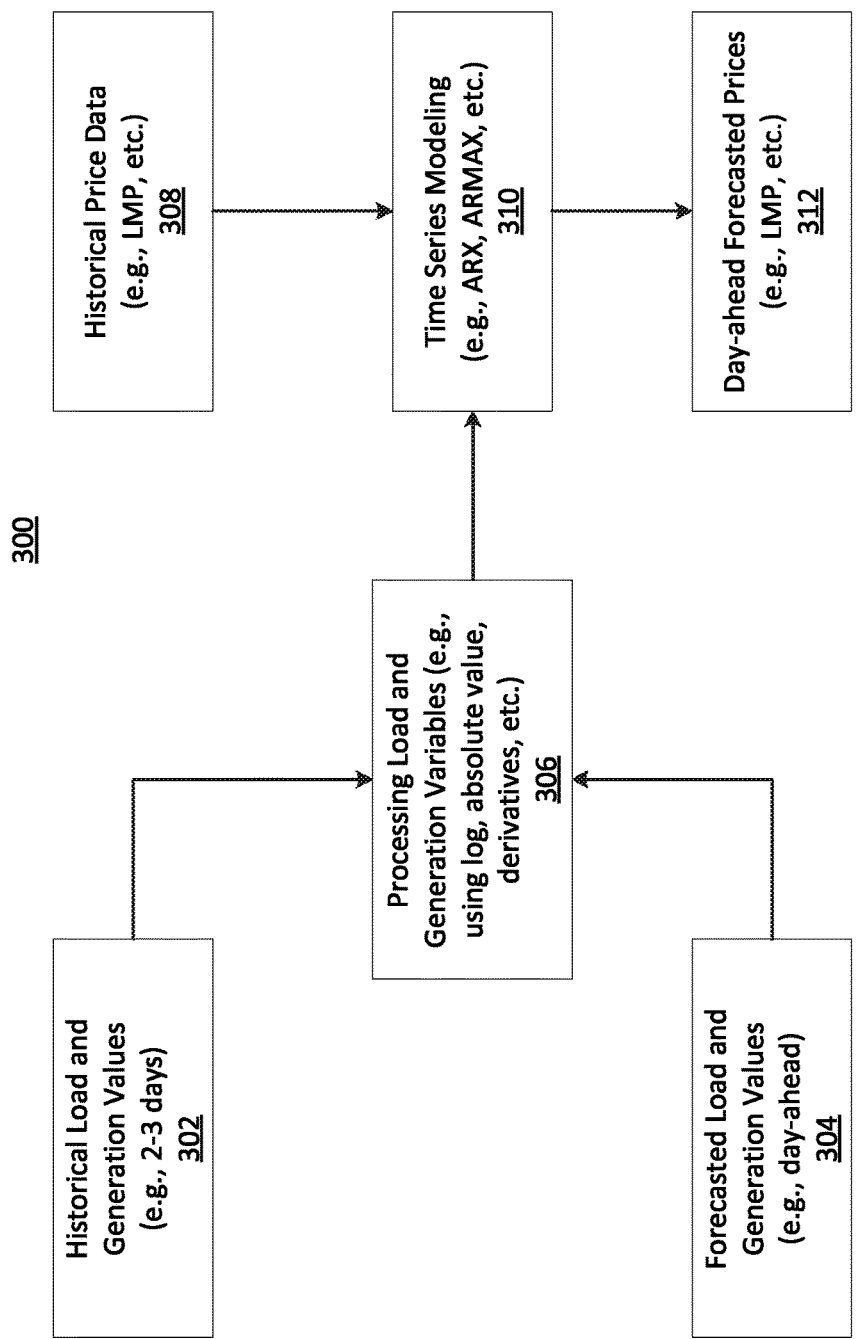
FIG. 3 shows an exemplary method for forecasting, in accordance with an embodiment of the present principles.
Figure 6:
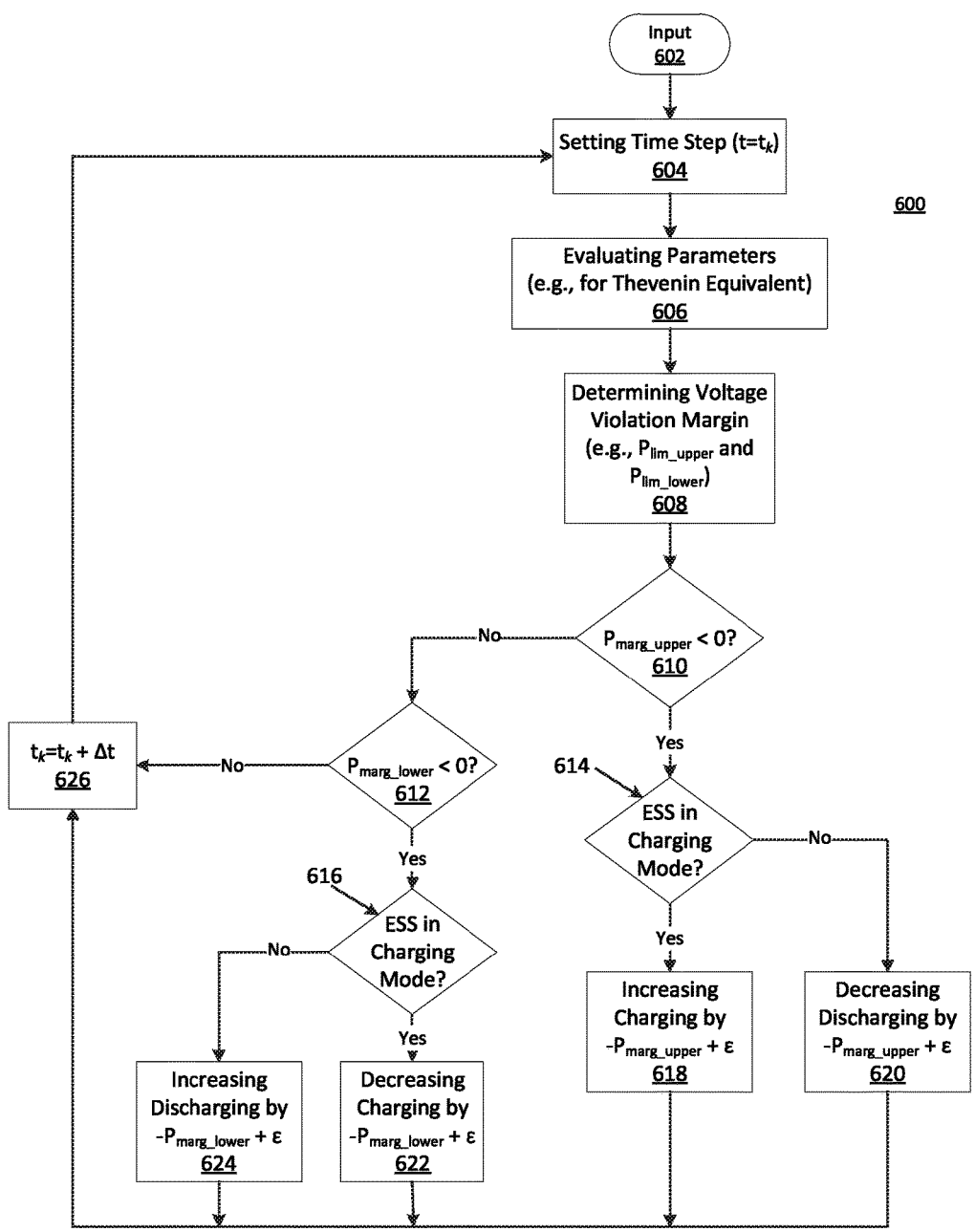
FIG. 6 shows an exemplary method for voltage regulation, in accordance with an embodiment of the present principles.

Further, it is to be appreciated that processing system 100 may perform at least part of the method described herein including, for example, at least part of methods 200, 300, and 600 of FIGS. 2, 3, and 6, respectively. Similarly, part or all of system 200 may be used to perform at least part of methods 200, 300, and 600 of FIGS. 2, 3, and 6, respectively.

Referring now to FIG. 2, a block/flow diagram of a method for dynamically controlling grid-scale Energy Storage Systems (ESSs) using hybrid energy management 200 is illustratively depicted in accordance with an embodiment of the present principles. In an embodiment, the method 200 may be employed to determine an optimal Grid Scale Storage (GSS) schedules to participate in day-ahead energy and Frequency Regulation (FR) markets, and to control voltage regulation services in real-time. A plurality of parameters related to energy market, network, and/or GSS operations may be measured of received according to various embodiments, and may be employed as input for a hybrid GSS management method 200 according to the present principles. The GSS management method according to the present principles is considered hybrid because of the combined (e.g., simultaneous) use of the primary and tertiary controls, and enables an ESS to be employed for multiple applications/purposes simultaneously according to various embodiments.

To participate in day-ahead markets, users of GSS units may submit energy bids to market operators prior to the beginning of each day. Thus, the method 200 may determine optimal bids (e.g., energy demands; requirements; requests; etc.) by, for example, performing co-optimization (e.g., optimizing in a plurality of markets (e.g., energy market, frequency regulation market, voltage regulation market, etc.) rather than optimizing just a single market) with dynamic constraints in block 209 for the next day. These bids may be based on, for example, forecasted market prices and/or estimated reserve capacity for voltage regulation operation according to various embodiments of the present principles.

In an embodiment, historical Independent System Operator (ISO) price data 202, historical and/or forecasted load and/or generation profiles/data 204 for the next day may be employed as input for time series modeling (e.g., Locational Marginal Price (LMP) time series modeling) in block 205 to forecast market prices according to the present principles. In an embodiment, a time series based method (e.g., Auto Regressive Moving Average with eXogeneous inputs (ARMAX), Auto-Regressive eXogeneous (ARX), etc.) may be employed for forecasting day-ahead electricity market prices in blocks 205 and 207. The time series modeling in blocks 205 and 207 will be discussed in further detail herein below.

In an embodiment, historical voltage profiles and voltage regulation requirements (e.g., at the point of GSS connection to the energy grid) 206 may be employed as input for time series modeling (e.g., Voltage Regulation (VR) time series modeling) in block 207 to determine (e.g., estimate) the necessary (or desired) ESS capacity for voltage regulation during each hour of the next day. The VR time series modeling 206 will be described in further detail herein below.

In an embodiment, the estimated LMP from block 205 and the estimated GSS/battery capacity (e.g., voltage regulation capacity) from block 207 may be employed as input for performing GSS/battery co-optimization with dynamic constraints using an optimizer in block 209. In an embodiment, GSS/battery cost and operation limits 208 may also be employed as input into an optimizer for performing co-optimization in block 209. The co-optimization in block 209 may determine optimal GSS bids for day-ahead market operation, and the bids may be generated and submitted (e.g., daily) to one or more market operators in block 216 according to the present principles.

In block 209, for simplicity of illustration of the co-optimizing, it may be assumed that a GSS unit is a price taker in both energy and FR markets according to an embodiment, although co-optimization may be performed in block 209 when a GSS unit is not a price taker in both energy and FR markets according to various embodiments. In an embodiment, the hourly revenue for the GSS unit from the markets (Rev) may be determined based on forecasted day-ahead LMP and FR market prices from blocks 205 and/or 207 as follows:

$$\text{Rev}(k) = \text{LMP}(k) P_b^{energy}(k) + \lambda^{reg}(k) P_b^{reg}(k), \quad (1)$$

where $P_b^{energy}$, $\lambda^{reg}$, and $P_b^{reg}$ represent hourly GSS power in an energy market, forecasted FR price, and GSS capacity in the FR market, respectively. In an embodiment, it may be assumed that the GSS provides equal regulation of up and down capacity during each hour of operation in the FR market. In an embodiment, the up and down capacity may include frequency regulation up and frequency regulation down capacities, which may be the same as the GSS schedule for the FR market. For simplicity of illustration, they may be assumed to be equal, and may be determined in the co-optimization by solving for $P_b^{reg}$ in (1). Therefore, only one FR regulation capacity and one FR price for each hour may be considered in (1) by the optimizer in block 209 according to an embodiment of the present principles.

In an embodiment, the co-optimization in block 209 may include modeling the hourly degradation cost using a battery life/degradation cost determination device according to the present principles. To model the hourly degradation cost of a GSS unit when participating in the market (Cost), and average model based on per unit degradation cost of GSS multiplied by its energy throughput may be generated as follows:

$$\text{Cost}(k) = C_b |P_b^{energy}(k)| + C_b P_b^{reg}(k), \quad (2)$$

where $C_b$ represents GSS per unit degradation cost. In an embodiment, scheduled power in the energy market may assume both positive and negative values (e.g., depending on the charge/discharge state of the GSS), while the scheduled capacity in the FR market may always be a positive value. Thus, the absolute value function may be applied only to the first term of the rate-harmonized scheduling (RHS) described in (2).

In an embodiment, actual degradation cost of a GSS unit may be less than the value determined using (1) because of two reasons. First, only a fraction of reserved capacity in the FR market is generally deployed during real-time operation. Second, desired GSS power in the energy and FR markets at each particular time instant may be in an opposite direction (e.g., the GSS power schedule for the energy market could be positive (discharge) while the GSS power schedule for the frequency regulation market is negative (charging)), and the total GSS power may be the sum of GSS power in the energy market and the GSS power in the frequency regulation market. This may reduce the total output power of the GSS and its degradation cost in some embodiments.

In an embodiment, the objective function of market co-optimization in block 209 may be considered in terms of daily net revenue as follows:

$$\max \sum_{k=1}^{24} (\operatorname{Re} v(k) - \operatorname{Cost}(k)), \quad (3)$$

which may be subject to constraints related to limited energy and power capacity of the GSS unit as follows:

$$SoC_{min}(k) \leq SoC(k) \leq SoC_{max}(k) \quad (4)$$

$$-P_b^{max}(k) \leq P_b^{energy}(k) \leq P_b^{max}(k) \quad (5)$$

$$P_b^{energy}(k) + P_b^{reg}(k) \leq P_b^{max}(k) \quad (6)$$

$$-P_b^{energy}(k) + P_b^{reg}(k) \leq P_b^{max}(k), \quad (7)$$

where SoC and $P_b^{max}$ represent the GSS state of charge and the GSS maximum power, respectively.

In an embodiment, GSS state of charge may be determined as follows:

$$SoC(k) = SoC(k-1) - \frac{P_b^{energy}(k)}{E_b}, \quad (8)$$

where $E_b$ represents the energy capacity of the GSS. The maximum and minimum values of the state of charge in (4), and the maximum GSS power in (6), (7), and (8) may be dependent on time (k) so that they may be adjusted dynamically (e.g., adjusted every hour) based on voltage regulation requirements using a voltage regulator in block 211 according to an embodiment of the present principles.

In an embodiment, multiple market co-optimization may be performed in block 209, and a sample objective function for day-ahead energy and regulation markets may be illustrated as follows:

max (9)

$$\sum_{h=1}^{24} (LMP[h] \times P_{battery}^{EM}[h] + C^{ru}[h] \times P_{battery}^{ru}[h] + C^{rd}[h] \times P_{battery}^{rd}[h] -$$

$$C_b \times |P_{battery}^{EM}[h] + P_{battery}^{ru}[h] + P_{battery}^{rd}[h]|),$$

where $$\max \sum_{h=1}^{24} (LMP[h] \times P_{battery}^{EM}[h])$$

represents the energy market arbitrage, $C^{ru}[h] \times P_{battery}^{ru}[h]$ represents regulation up-revenue, $C^{rd}[h] \times P_{battery}^{rd}[h]$ represents regulation-down revenue, and $C_b \times |P_{battery}^{EM}[h] + P_{battery}^{ru}[h] + P_{battery}^{rd}[h]|)$ represents battery wear cost. In an embodiment, the energy arbitrage market, regulation-up revenue, regulation-down revenue, and battery wear cost may be subject to dynamic constraints/limits (e.g., state-of-charge (SOC) limits, maximum charge and discharge power limits, etc.), and the consideration of the battery wear cost may enable maximization of total net revenue according to the present principles.

In an embodiment, after the optimal GSS hourly schedule for market operation is generated by the optimizer in block 209, the generated schedule may be employed for adaptive voltage regulation and GSS dispatching in block 211. In an embodiment, second-by-second control of the GSS unit during the day according to GSS market schedule and voltage regulation requirements may be performed in block 211 using, for example, a voltage regulator according to the present principles. Network voltage/current and GSS/battery parameters may be measured at each time-step in blocks 210 and 212, respectively, and employed as input for block 211. In block 214, real-time charge and discharge commands may be sent to the GSS unit to control participation in the voltage regulation market (e.g., second-by-second control) in block 218 according to an embodiment of the present principles. The voltage regulation using will be described in further detail herein below.

Referring now to FIG. 3, an exemplary method for forecasting 300 is illustratively depicted in accordance with an embodiment of the present principles. In an embodiment, the method 300 may employ two steps for forecasting day-ahead prices in electricity markets. The first step may include processing inputs, including, historical load and/or generation values (e.g., 2-3 days) from block 302, forecasted load and/or generation values (e.g., 2-3 days) from block 304, and historical price data (e.g., LMP, etc.) from block 308. In another embodiment, forecasting may not be a two-step process, and may employ a plurality of signals and their functions as exogeneous inputs during processing.

In an embodiment, inputs (e.g., 302, 304) may be processed using various functions to obtain the actual input signals to the models (e.g., ARMAX models) in block 306. The particular function choice for processing load and/or generation variables (e.g., using log, absolute value, derivatives, etc.) in block 306 may be dependent on the particular price that is to be forecasted. For example, LMP is highly dependent on the load forecasts from block 304 and the times at which the load forecast reaches maximum and minimum values (which may be determined through derivatives). In an embodiment, to forecast frequency regulation prices, functions such as absolute value may be employed in block 306 according to the present principles.

In an embodiment, the inputs processed in block 306 may be employed as input for the time series modeling (e.g., time series forecasting) in block 310. An illustrative example of a time series model according to an embodiment is the following:

$$P(t+1) = a_1 P(t) + a_2 P(t-1) + a_3 P(t-2) + b_1 \bar{P}(t) + b_2 \bar{P}(t-1) + c_1 X(t) + c_2 X(t-1) + \varepsilon(t), \quad (10)$$

where P is a price (e.g., LMP, frequency regulation price), and $\overline{P}$ is a moving average considering a fixed number of steps back. The price forecast (P(t+1)) may also be a function of the past (e.g., historical) values of exogenous inputs (X(t), (X(t−1)). In an embodiment, unique exogenous inputs which are functions of historical values of load and generation 302, as well as functions of load forecasts 304 may be employed during time series modeling (e.g., ARX, ARMAX, etc.) in block 310 to generate day-ahead forecasted prices in block 312 according to the present principles.

Figure 4:
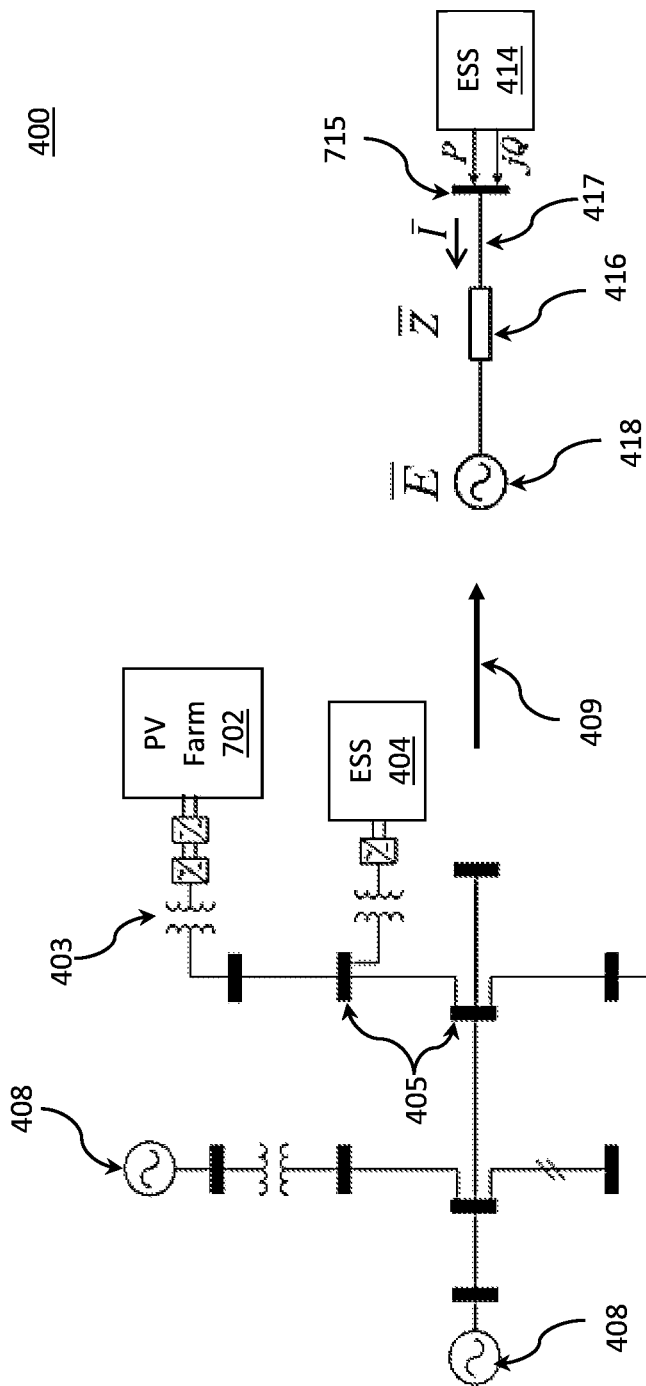
FIG. 4 shows an exemplary power system and a simplified equivalent model in accordance with an embodiment of the present principles.

Referring now to FIG. 4, an exemplary power system and a simplified equivalent model 400 are illustratively depicted in accordance with an embodiment of the present principles. In an embodiment, the power system 400 may include one or more photovoltaic (PV) farms 702, and one or more grid scale energy storage systems (GSESSs) 404. Voltage regulation may be employed to control the real and reactive power injection at points of common coupling (PCCs) 405 by dispatching GSS. One or more voltage sources 408 may be employed according to various embodiments.

In an embodiment, the power system representation may be simplified as, for example, a Thevenin equivalent, by performing equivalencing in block 409. After equivalencing, the simplified system is depicted, and $\overline{E}$ is a complex variable representing voltage of the equivalent source in block 418, $\overline{Z}$ (complex) is the impedence of the Thevenin equivalent in block 416, $\overline{I}$ is the current in block 417, and $\overline{V}$ (complex) is the voltage phasor at the PCC 415. In an embodiment, $\overline{I}$, P, and Q are current, phasor, active power injection, and reactive power injection from GSS (or ESS) 414 into the grid, respectively. In various embodiments, the above variables may constantly be changing as system operating conditions change.

Figure 5:
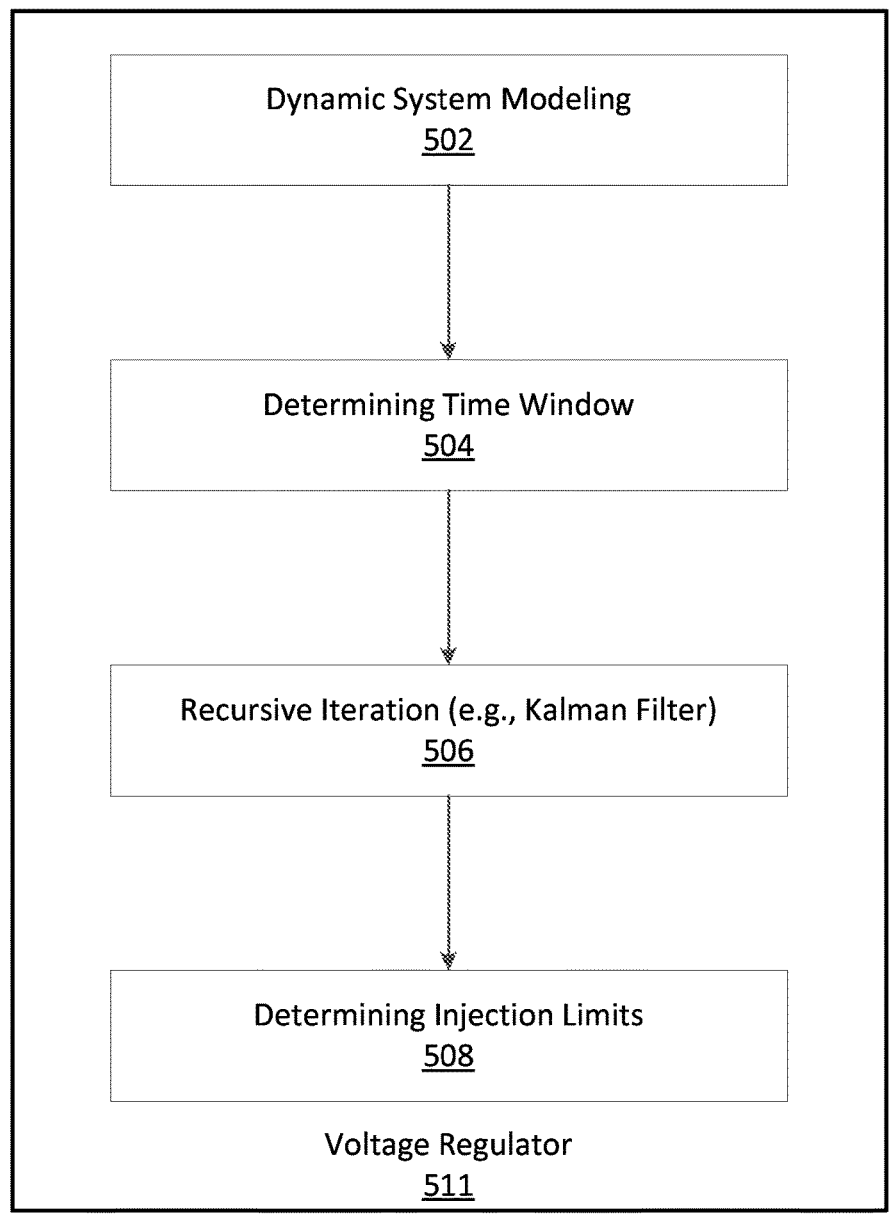
FIG. 5 shows an exemplary system and method for voltage regulation, in accordance with an embodiment of the present principles.

Referring now to FIG. 5, with continued reference to FIG. 4, a high level diagram of an exemplary system and method for voltage regulation 500 is illustratively depicted in accordance with an embodiment of the present principles. In an embodiment, a voltage regulator 511 may be employed for voltage regulation (e.g., control the real and reactive power injection at a point of common coupling (PCC) by dispatching GSSs. In an illustrative embodiment which may employ a Kalman filter in block 506, dynamic system modeling may be performed in block 502 (e.g., using $\overline{V}$, $\overline{E}$, $\overline{Z}$, and $\overline{I}$ described with reference to FIG. 3) by the following method:

$$\overline{V} = \overline{E} + \overline{Z} \cdot \overline{I} \tag{11}$$

Define the following:

$$\overline{E} = E_R + j \cdot E_I \tag{12}$$

$$\overline{V} = V_R + j \cdot V_I \tag{13}$$

$$\overline{Z} = R + j \cdot X \tag{14}$$

$$\overline{I} = I_R + j \cdot I_X, \tag{15}$$

where $=\sqrt{-1}$. In an embodiment, equation (11) may be broken up into two real equations during system modeling 502, which, in matrix format, may be shown by the following:

$$\begin{bmatrix} V_R \\ V_I \end{bmatrix} = \begin{bmatrix} 1 & 0 & I_R & -I_I \\ 0 & 1 & I_I & I_R \end{bmatrix} \cdot \begin{bmatrix} E_R \\ E_I \\ R \\ X \end{bmatrix} \tag{16}$$

In an embodiment, during system modeling 502, voltage and current injection at a PCC can be measured, and therefore $V_R$, $V_I$, $I_R$ and $I_I$ may be considered as known variables while $E_R$, $E_I$, R, and X may be parameters to estimate. To solve two equations with four unknowns, at least two measurement points are employed. In an embodiment, a sliding window containing four measurement points may be employed for the parameter estimation according to the present principles.

In an embodiment, a filter (e.g., Kalman filter) may be employed during system modeling in block 502 and time window (e.g., time step) determination in block 504. A Kalman filter is an optimal state estimator for dynamical systems. It may be employed to estimate the system unknown states efficiently in a recursive way. A general discrete state-space representation of a dynamic system may be represented as follows:

$$x_{k+1} = A_k x_k + w_k \tag{17}$$

$$z_k = H_k x_k + V_k, \tag{18}$$

where $x_k$ is the state vector; $A_k$ is the state transition matrix; $Z_k$ is the measurement vector; $H_k$ is the observation matrix; $w_k$ and $v_k$ are the process noise and measurement noise. In an embodiment, noise $w_k$ and $v_k$ may be assumed to be independent of each other, and their covariance matrixes may be given by the following:

$$E(w_k w_k^T) = R_k \tag{19}$$

$$E(v_k v_k^T) = Q_k \tag{20}$$

In block 504, the vectors/matrices from equations (17) and (18) may be employed to determine the time window (e.g., time step), and may be defined as follows:

$$x_k = \begin{bmatrix} E_R^k \\ E_I^k \\ R_k \\ X_k \end{bmatrix}_{4 \times 1} \tag{21}$$

$$z_k = \begin{bmatrix} V_R^{k1} \\ V_I^{k1} \\ \vdots \\ V_R^{k4} \\ V_I^{k4} \end{bmatrix}_{8 \times 1} \tag{22}$$

$$A_k = \begin{bmatrix} 1 & & & \\ & 1 & & \\ & & 1 & \\ & & & 1 \end{bmatrix}_{4 \times 4} \tag{23}$$

$$H_k = \begin{bmatrix} 1 & 0 & I_R^{k1} & -I_I^{k1} \\ 0 & 1 & I_I^{k1} & I_R^{k1} \\ \vdots & \vdots & \vdots & \vdots \\ 1 & 0 & I_R^{k4} & -I_I^{k4} \\ 0 & 1 & I_I^{k4} & I_R^{k4} \end{bmatrix}_{8 \times 4}, \tag{24}$$

where $(.)^k$ refers to the unknown parameters at the k th time step (window), and $(.)^{ki}$ refers to the i th measurement point at the k th time step (window).

In an embodiment, recursive iteration using, for example, a Kalman filter, may be performed in block 506, and unknown parameters at each time instant (e.g., from block 504) may be determined according to the present principles using the following recursive method:

$$P_{k+1}=A_{k+1}P_k A_{k+1}^T+Q_k \qquad (25)$$

$$K_{k+1}=P_{k+1}H_{k+1}^T[H_{k+1}P_{k+1}H_{k+1}^T+R_{k+1}]^{-1} \qquad (26)$$

$$x_{k+1}=A_{k+1}x_k+K_{k+1}[z_{k+1}-H_{k+1}A_k x_k] \qquad (27)$$

$$P_{k+1}=P_{k+1}-K_{k+1}H_{k+1}P_{k+1}, \qquad (28)$$

where $K_k$ is the Kalman gain at time step k.

In an embodiment, after calculating the Thevenin equivalent impedance at a PCC using recursive iteration in block 506, the power needed to keep voltage within a required (or desired) limit (e.g., injection limits) may be determined in block 508 according to the present principles. The change in voltage caused by variation in injections may be determined by the following method:

$$\Delta \overline{V} = \frac{\Delta P - j\Delta Q}{\overline{V}^*} \cdot (R+jX) \qquad (29)$$

where $\overline{V}^*$ is the conjugate of variable $\overline{V}$. Therefore, based on the operating condition (SOC, power factor, etc.) of grid scale energy storage, the power injection can be adjusted to regulate the voltage at PCC according to various embodiments of the present principles.

Referring now to FIG. 6, with continued reference to FIGS. 4 and 5, an exemplary method for voltage regulation 600 is illustratively depicted in accordance with an embodiment of the present principles. In an embodiment, after determining the maximum power injection possible at a particular PCC in block 508, a voltage violation margin may be defined as the difference between the power injection limits and the actual power injection (determined in block 608), the output of which may be employed for voltage regulation using the voltage regulator 511.

In an embodiment, the maximum power injection at a particular PCC is input in block 602, and an initial time step (e.g., $t=t_k$) may be set in block 604. Parameters may be evaluated (e.g., for a Thevenin equivalent) using, for example, a Kalman filter in block 506, and the voltage violation margin (e.g., $P_{lim\_upper}$ and $P_{lim\_lower}$) may be calculated in block 608. In block 610, if $P_{marg\_upper}$<0, then it is determined whether a particular ESS is in charging mode in block 614. If yes, charging may be increased by $-P_{marg\_upper}+\varepsilon$ in block 618, where $\varepsilon$ represents a small positive number, and is employed to ensure that voltage is restored to a normal (e.g., acceptable) range (e.g., 0.9 pu to 1.1 pu). If no, then discharging may be decreased by $-P_{marg\_upper}+\varepsilon$ in block 620. A next time step (e.g., $t=t_k+\Delta t$) may be determined in block 626, a new time step may be set in block 604, and the method may iteratively repeat to continually track system voltage to ensure the system voltage is within a normal (e.g., acceptable) range.

In an embodiment, if $P_{marg\_upper}$ is determined to not be less than 0 in block 610, then it is determined whether $P_{marg\_lower}$<0 in block 612. If yes, then it may be determined whether a particular ESS is in charging mode in block 616. If yes, charging may be decreased by $-P_{marg\_lower}+\varepsilon$ in block 622. If no, then discharging may be increased by $-P_{marg\_lower}+\varepsilon$ in block 624. If $P_{marg\_lower}$ is determined to be greater than 0 in block 612, then a next time step (e.g., $t=t_k+\Delta t$) may be determined in block 626, a new time step may be set in block 604, and the method may iteratively repeat until a particular threshold has been met according to various embodiments.

Figure 7:
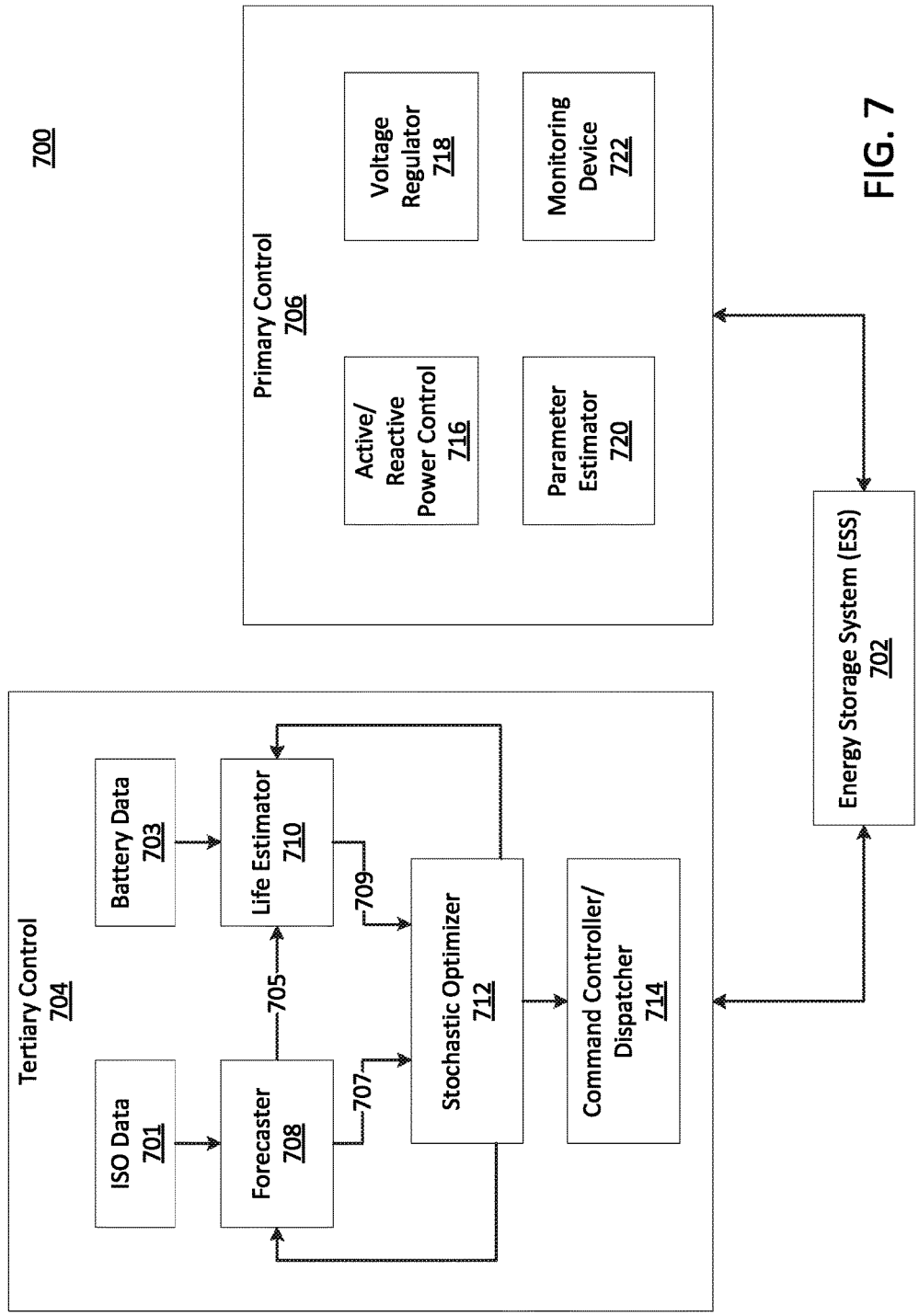
FIG. 7 shows an exemplary system and method for primary and tertiary control of Energy Storage Systems (ESSs), in accordance with an embodiment of the present principles.

Referring now to FIG. 7, an exemplary system and method for primary and tertiary control of Energy Storage Systems (ESSs) 700 is illustratively depicted in accordance with an embodiment of the present principles. In an embodiment, one or more ESSs may be controlled using a primary controller 706 and a tertiary controller 704 for optimal battery dispatch and/or automated power injection for voltage regulation in accordance with the present principles.

In an embodiment, a tertiary controller 704 may be employed for optimization and determining and submitting daily bids for day-ahead energy markets. Independent System Operator (ISO) data may be input in block 701, and a forecaster 708 may be employed for time series forecasting (e.g., ARX forecasting) to determine a profile of future ISO signals. The output of the forecaster 708 and historical battery data 703 may be employed as input to a life estimator 710 to determine an optimal battery dispatch schedule. The life estimator may calculate the life impact of the providing of the forecasted ISO service, and the output of the life estimator may be employed for optimization (e.g., stochastic dispatch optimization) in block 712. Stochastic optimization in block 712 may evaluate a cost tradeoff of providing the ISO service bs. battery life cost for a plurality of situations to determine the optimal battery dispatch according to the present principles. The output of the optimization in block 712 may be employed for command controlling/dispatching in block 714.

In an embodiment, the forecaster 708 may employ autoregressive exogenous service forecasting. Offline simulations may be employed to estimate optimal battery size (e.g., if not provided by service provider), and the life estimator 710 may evaluate the real-time cost of all services, enabling the services to be provided in the most economical way without compromising battery life. The life estimator 710 may ascertain safe operating parameters and discharge limits to generate auction bids and derive favorable operational conditions for the battery system. The forecaster 708 and life estimator 710 may be employed to proactively provision battery resources between usable and reserved allocations for day-ahead, hour-ahead, and real-time markets according to various embodiments using the market-aware controllers 704, 706 according to the present principles.

In an embodiment, a primary controller 706 may be employed for second by second control of participation in a voltage regulation market. In an embodiment, a monitoring device may be employed to monitor real-time conditions within an energy system. In an embodiment, the primary controller 706 may include a real-time system parameter estimator 720 based on Kalman filtering that enables millisecond level control for voltage regulation. In an embodiment, an active power controller 716 may dispatch ESS automatically to maintain voltage within a normal range, and a reactive power controller 716 may dispatch ESS's reactive power output to support a power system. A voltage regulator 718 may control ESS for conservation voltage regulation (CVR) to reduce system loss and save energy according to various embodiments of the present principles.

In an embodiment, reliability of energy systems may be improved using the life estimator 710 and forecaster 708, and high speed operation without remote communication may be enabled. Forecasting and life estimation enables proactive provisioning of battery to preempt failures due to accelerated degradation. Maintaining a stable voltage also improves system reliability. High speed primary control 706 using parameter identification in block 720 enables automated operation during loss of remote communication. While most failures in the past have occurred in the inverters and power electronics, and conventional systems cannot prevent such failures, the present principles may be employed to track life effects and tailor performance so as to prevent such failures by delivering reliable service consistently according to various embodiments of the present principles.

Figure 8:
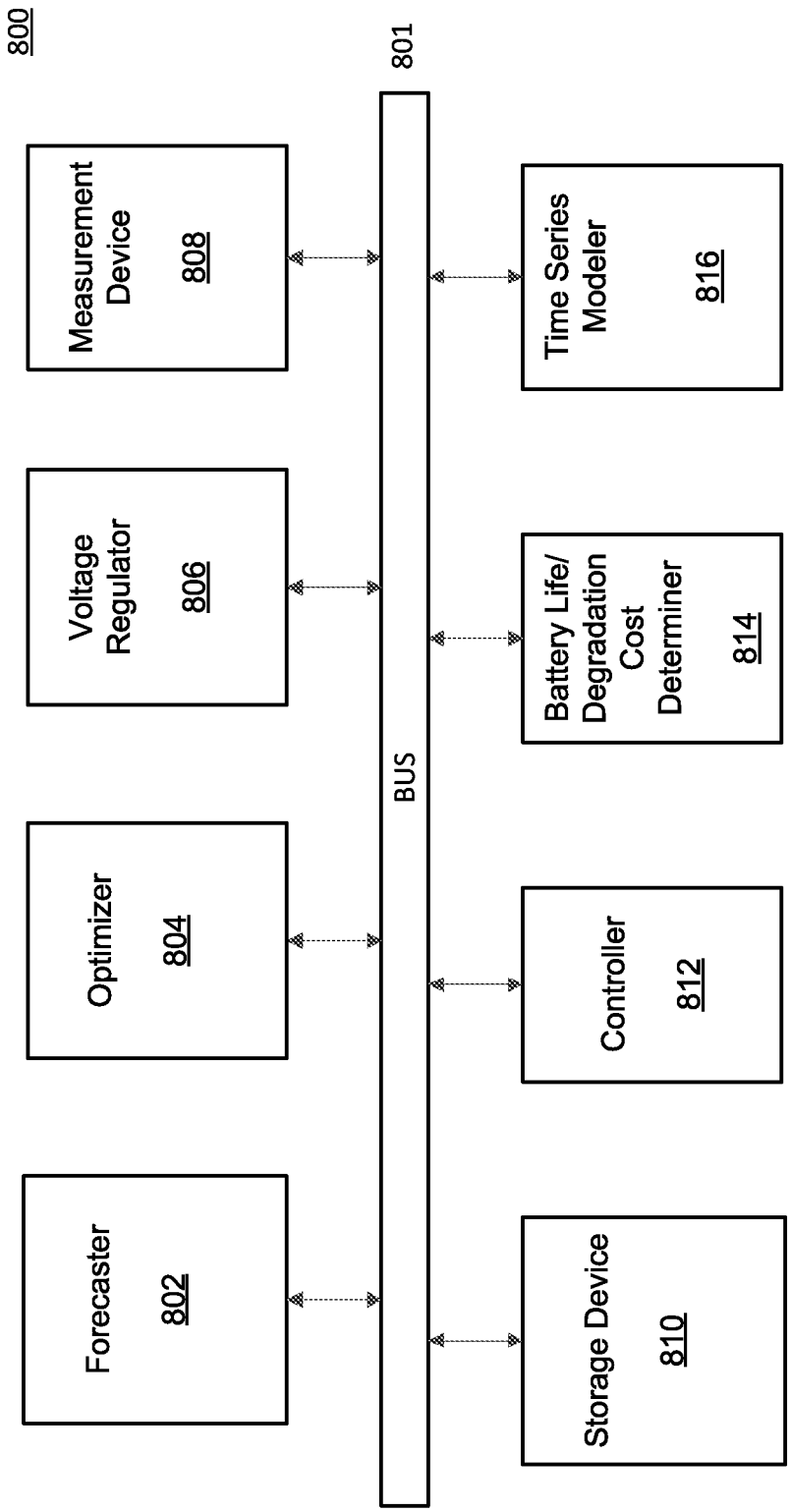
FIG. 8 shows an exemplary system for dynamically controlling grid-scale Energy Storage Systems (ESSs), in accordance with an embodiment of the present principles.

FIG. 8 shows an exemplary system for dynamically controlling grid-scale Energy Storage Systems (ESSs) 800, with continued reference to FIG. 2, in accordance with an embodiment of the present principles. While many aspects of system 800 are described in singular form for the sakes of illustration and clarity, the same can be applied to multiples ones of the items mentioned with respect to the description of system 800. For example, while a single voltage regulator 806 is described, more than one voltage regulator 806 can be used in accordance with the teachings of the present principles, while maintaining the spirit of the present principles. Moreover, it is appreciated that the voltage regulator is but one aspect involved with system 800 than can be extended to plural form while maintaining the spirit of the present principles.

The system 800 can include a forecaster 802, an optimizer 804, a voltage regulator 806, a measurement device 808, a storage device 810, a controller 812, a battery life/degradation cost determiner 814, and a time series modeler 816.

In an embodiment, the forecaster 802 may forecast load and/or generation profiles/data for day-ahead energy markets (as described above with reference to FIG. 2), and the forecasts may be stored in a storage device 810, and may be input into a time series modeler 816 for LMP and/or voltage regulation time series modeling (as described above with reference to FIG. 2) according to various embodiments.

In an embodiment, a battery life/degradation cost determiner 208 may be employed to determine GSS/battery costs and operation limits, and the output of the time series modeler 816 and the determiner 814 may be employed as input for co-optimization (as described above with reference to FIG. 2) using the optimizer 804. A measurement device 808 may be employed to take, for example, battery, and network voltage and current measurements. The measurements (e.g., 210, 212) and the output of the optimizer 804 may be employed by the voltage regulator 806 for voltage regulation (as described above with reference to FIG. 2) according to various embodiments of the present principles. In an embodiment, the controller 812 may control distribution of energy to or from the one or more ESSs based on the optimal bids generated by the optimizer 804. In some embodiments, the controller 812 may be a virtual appliance (e.g., computing device, node, server, etc.), and may be directly connected to an ESS or located remotely for controlling via any type of transmission medium (e.g., Internet, intranet, internet of things, etc.). In some embodiments, the controller 812 may be a hardware device, and may be attached to an ESS or built into an ESS according to the present principles.

In the embodiment shown in FIG. 8, the elements thereof are interconnected by a bus 801. However, in other embodiments, other types of connections can also be used. Moreover, in an embodiment, at least one of the elements of system 800 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 800 are readily determined by one of ordinary skill in the art, given the teachings of the present principles provided herein, while maintaining the spirit of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer implemented method for energy distribution for one or more grid-scale Energy Storage Systems (ESSs), comprising:
   controlling, using a tertiary controller:
      generating of one or more time series models to provide forecasted pricing data for one or more markets;
      determining of battery life and degradation costs for one or more batteries in one or more ESSs to provide battery life and degradation costs, the degradation costs being determined for time step k as:

$$\text{Cost}(k) = C_b |P_b^{energy}(k)| + C_b P_b^{reg}(k),$$

where $C_b$ represents per unit degradation costs for the one or more ESSs, $P_b^{energy}(k)$ represents power of the one or more ESSs for time step k, and $P_b^{reg}(k)$ represents capacity of the one or more ESSs in a frequency regulation (FR) market; and
      optimizing of bids for the one or more markets to generate optimal bids based on at least one of the forecasted pricing data or the battery life and degradation costs; and
   controlling, using a primary controller, distributing of energy to or from the one or more ESSs based on the optimal bids, the primary controller being configured for:
      regulating voltage at a point of connection to a power grid from the one or more ESSs, the regulating further comprising maintaining a stable voltage by controlling, using a reactive power controller, reactive power injection at one or more points of common coupling (PCCs) from the one or more ESSs to the power grid; and
      controlling, using an active power controller, real-time charge and discharge commands based on the optimizing and regulating for real-time control of the one or more ESSs.

2. The method of claim 1, wherein the one or more time series models include a Locational Marginal Price (LMP) time series model and a voltage regulation time series model.

3. The method of claim 1, wherein the determining battery life and degradation costs is performed on an hourly basis for each of the one or more ESSs, wherein the determining further comprises generating an average model based on per unit degradation costs of each ESS multiplied by the energy throughput of the ESS.

4. The method of claim 1, wherein the optimizing further comprises performing stochastic optimization to evaluate a cost tradeoff of providing energy services vs. battery life costs for a plurality of situations to determine an optimal battery dispatch, wherein the one or more markets include an energy market and a frequency market.

5. The method of claim 1, wherein the controlling further comprises actively controlling power to dispatch ESSs automatically to maintain a system voltage within a normal range.

6. The method of claim 1, wherein the regulating controls the one or more ESSs to reduce system loss and save energy using conservation voltage regulation (CVR).

7. The method of claim 1, wherein the bids are day-ahead energy bids.

8. A system for energy distribution for one or more grid-scale Energy Storage Systems (ESSs), comprising:
   a tertiary controller, comprising:
      a forecaster, coupled to a bus, for generating one or more time series models to predict pricing data for one or more markets, with the one or more time series models being stored therein;
      a determiner for providing battery life and degradation costs for one or more batteries in the one or more ESSs, the degradation costs being determined for time step k as:

$$\text{Cost}(k) = C_b |P_b^{energy}(k)| + C_b P_b^{reg}(k),$$

where $C_b$ represents per unit degradation costs for the one or more ESSs, $p_b^{energy}(k)$ represents power of the one or more ESSs for time step k, and $P_b^{reg}(k)$ represents capacity of the one or more ESSs in a frequency regulation (FR) market; and
      an optimizer, coupled to the bus, for generating optimal bids for the one or more markets based on the pricing data or the battery life and degradation costs for the one or more ESSs; and
   a primary controller for distributing energy to or from the one or more ESSs based on the optimal bids, the primary controller comprising:
      a regulator coupled to the bus for voltage regulation at a point of connection to a power grid from the one or more ESSs, the regulator further comprising a reactive power controller configured to maintain a stable voltage by controlling reactive power injection at one or more points of common coupling (PCCs) from the system to the power grid; and
      an active power control configured to generate and issue real-time charge and discharge commands based on the optimal bids and the voltage regulation for real-time control of the one or more ESSs.

9. The system of claim 8, wherein the one or more time series models include a Locational Marginal Price (LMP) time series model and a voltage regulation time series model.

10. The system of claim 8, wherein the determiner provides battery life and degradation costs on an hourly basis for each of the one or more ESSs, and the battery life and degradation costs are determined by generating an average model based on per unit degradation costs of each ESS multiplied by the energy throughput of the ESS.

11. The system of claim 8, wherein the optimizer performs stochastic optimization to evaluate a cost tradeoff of providing energy services vs. battery life costs for a plurality of situations to determine an optimal battery dispatch.

12. The system of claim 8, wherein the primary controller actively controls power to dispatch ESSs automatically to maintain system voltage within a normal range.

13. The system of claim 8, wherein the regulator controls the one or more ESSs to reduce system loss and save energy using conservation voltage regulation (CVR).

14. The system of claim 8, wherein the tertiary controller performs real-time system parameter identification to enable millisecond level control of voltage regulation by the primary controller.

15. A non-transitory computer-readable storage medium comprising a computer readable program for energy distribution for one or more grid-scale Energy Storage Systems (ESSs), wherein the computer readable program when executed on a computer causes the computer to perform the steps of:
   controlling, using a tertiary controller:
      generating of one or more time series models to provide forecasted pricing data for one or more markets;
      determining of battery life and degradation costs for one or more batteries in or more ESSs to provide battery life and degradation costs, the degradation costs being determined for time step k as:

$$\text{Cost}(k) = C_b |P_b^{energy}(k)| + C_b P_b^{reg}(k),$$

where $C_b$ represents per unit degradation costs for the one or more ESSs, $P_b^{energy}(k)$ represents power of the one or more ESSs for time step k, and $P_b^{reg}(k)$ represents capacity of the one or more ESSs in a frequency regulation (FR) market; and
      optimizing of bids for the one or more markets to generate optimal bids based on at least one of the forecasted pricing data or the battery life and degradation costs; and
   controlling, using a primary controller, distributing of energy to or from the one or more ESSs based on the optimal bids, the primary controller being configured for:
      regulating voltage at a point of connection to a power grid from the one or more ESSs, the regulating further comprising maintaining a stable voltage by controlling, using a reactive power controller, reactive power injection at one or more points of common coupling (PCCs) from the one or more ESSs to the power grid; and
      controlling, using an active power controller, real-time charge and discharge commands based on the optimizing and regulating for real-time control of the one or more ESSs.

16. The non-transitory computer-readable storage medium of claim 15, wherein the determining battery life and degradation costs is performed on an hourly basis for each of the one or more ESSs, and is determined by generating an average model based on per unit degradation costs of each ESS multiplied by the energy throughput of the ESS.

* * * * *